I. MOSS.
SNAP FASTENER.
APPLICATION FILED OCT. 4, 1917.
1,268,870. Patented June 11, 1918.
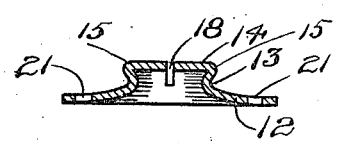
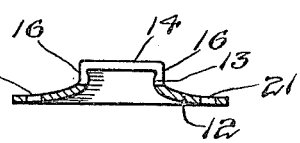
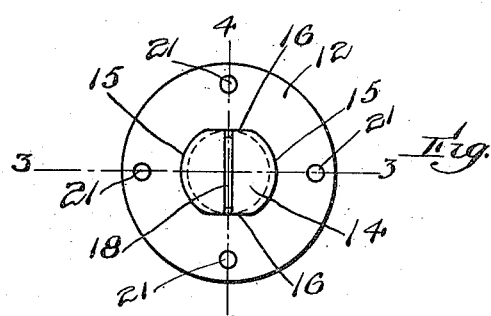
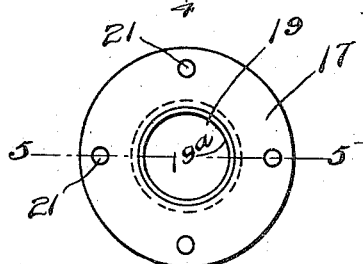
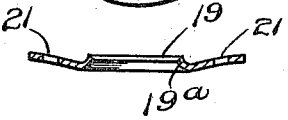
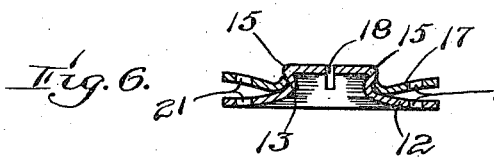
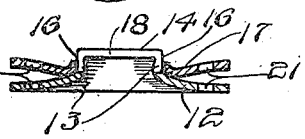
Inventor:
Isidor Moss,
by Wright Brown Quinby & May
Attorneys.

UNITED STATES PATENT OFFICE.

ISIDOR MOSS, OF BROOKLINE, MASSACHUSETTS.

SNAP-FASTENER.

1,268,870. Specification of Letters Patent. Patented June 11, 1918.

Application filed October 4, 1917. Serial No. 194,793.

*To all whom it may concern:*

Be it known that I, ISIDOR MOSS, a citizen of the United States, residing at Brookline, in the county of Norfolk and State of Massachusetts, have invented new and useful Improvements in Snap-Fasteners, of which the following is a specification.

This invention relates to a snap fastener comprising a male member or stud and a female member or socket, the male member being adapted to snap into the female member and be retained therein by its own resilience.

The object of the invention is to provide a snap fastener of this character, the members of which, while adapted to be readily interengaged and separated, are firmly interlocked against liability of accidental separation.

The invention is embodied in the improvements which I will now proceed to describe and claim.

Of the accompanying drawings forming a part of this specification and illustrating the preferred embodiment of the invention, Figure 1 is a plan view of the male or stud member of my improved fastener.

Fig. 2 is a plan view of the female or socket member.

Fig. 3 is a section on line 3—3 of Fig. 1.

Fig. 4 is a section on line 4—4 of Fig. 1.

Fig. 5 is a section on line 5—5 of Fig. 2.

Fig. 6 is a sectional view showing the members interlocked, the section through the male member being on the plane of line 3—3 of Fig. 1.

Fig. 7 is a view similar to Fig. 6, the section through the male member being on the plane of line 4—4 of Fig. 1.

The same reference characters indicate the same parts in all of the figures.

The male or stud member of my improved fastener is preferably formed from a single blank of sheet metal and has attaching means, preferably embodied in a circular flange 12, and a stud composed of a circular shank 13, and a head 14.

The periphery of the head has a portion of relatively large diameter and a portion of smaller diameter, the portion of larger diameter being formed by two segmental portions 15 having a common center, and the portions of a smaller diameter being formed by reduced flattened portions 16 which may be produced by cutting the head away or forcing it inwardly at intervals.

The larger diameter of the stud head is greater than that of the circular shank 13, the segmental portions 15 overhanging the shank, as indicated by Figs. 3 and 6. The smaller diameter of the head is substantially equal to the diameter of the shank, as indicated by Figs. 4 and 7. The larger diameter of the stud member is rendered resilient and compressible by the slot 18 intersecting the reduced portions 16. Said slot permits the divisions of the head having the segmental portions 15 to approach and recede from each other. The smaller diameter of the head is however rigid and incompressible in the direction of the slot 18.

The female or socket member 17 of the fastener is formed from a single sheet metal blank, preferably of annular form, said member having a circular opening 19, the wall of which is continuous and inexpansible. The diameter of the opening 19 is smaller than the larger diameter of the stud and is such that the wall of the opening has a close fit on the shank 13, so that when the stud member is forced into the opening 19 its larger diameter will be reduced or compressed until the segmental portions 15 pass through the opening, said portions then expanding into engagement with the wall of the opening 19, as indicated by Fig. 6.

It will now be seen that when the members are interengaged, the segmental portions 15 of the stud member are engaged throughout their entire length with elongated portions of the wall of the opening 19, so that there is a firm engagement between the two members, preventing liability of accidental separation of the same.

The central portion of the socket member 17 containing the opening 19 is preferably offset to form a tapering or frusto-conical annular face 19ª, adapted to facilitate the entrance of the head 14 into said opening, said face exerting displacing pressure on the segmental portions 15 of the head tending to force said portions toward each other.

The flange 12 of the male member and the body of the female member may have stitch-receiving orifices 21.

It will be seen that the stud member head is of oblong form and has a shorter axis between the flattened portions 16, and a longer axis at right angles with the shorter axis. It will also be seen that the shorter axis is practically rigid and incompressible, while the longer axis is resilient and compressible, and that portions of the head at the ends of its longer axis overhang portions of the shank 13.

The stud member thus formed is adapted to coöperate with a socket member having an orifice 19, the wall of which is practically inexpansible and is formed to compress the longer axis of the head and cause the overhanging portions thereof to snap into engagement with said wall when force is exerted in opposite directions on the two members.

The inexpansible circular wall of the orifice 19 has a diameter greater than the length of the shorter axis of the head, and less than the length of the longer axis of the head. The circular form of the orifice enables the socket member to engage the stud member without the necessity of causing the socket wall and the stud head to register, or in other words, without the necessity of turning the socket member to any given or predetermined position to cause its socket wall to properly engage the stud head.

I claim:

1. A snap fastener comprising a stud member having a substantially circular head, the periphery of which is reduced at intervals to form a larger and a smaller diameter, a circular shank of smaller diameter than the larger diameter of the head, and attaching means, the larger diameter of the head being resilient and compressible and the smaller diameter relatively rigid and incompressible, and a socket member having attaching means and a circular orifice the wall of which is inexpansible and has a diameter less than the larger diameter of the head.

2. A snap fastener comprising a stud member having a substantially circular head, a circular shank of smaller diameter than the head, and attaching means, the head being slotted to render it resilient and compressible in one direction and relatively rigid and incompressible in another direction, and its periphery being reduced at intervals to reduce the diameter of the rigid portion, and a socket member having attaching means and a circular orifice, the wall of which is inexpansible and has a diameter less than the larger diameter of the head.

3. A snap fastener comprising a stud member having a head, the periphery of which has opposite segmental portions and intermediate reduced portions, so that the head has a portion of relatively large diameter and a portion of smaller diameter, the head having also a slot intersecting the reduced portions and rendering the larger diameter resilient and compressible while the smaller diameter is relatively rigid and incompressible, and a socket member having attaching means and a circular orifice, the wall of which is inexpansible and has a diameter less than the larger diameter of the head.

4. A snap fastener comprising a stud member having a head, the periphery of which has opposite segmental portions and intermediate reduced portions, so that the head has a portion of relatively large diameter and a portion of smaller diameter, the head having also a slot intersecting the reduced portions and rendering the larger diameter resilient and compressible while the smaller diameter is relatively rigid and incompressible, and a socket member having attaching means and a circular orifice, the wall of which is inexpansible and has a diameter less than the larger diameter of the head, said socket member being provided with an annular tapering face adapted to exert displacing pressure on the segmental portions of the head.

5. A snap fastener comprising a stud member having a shank, attaching means, and an oblong head which is resilient and compressible in the direction of its longer axis and rigid and incompressible in the direction of its shorter axis, portions of the head at each of the ends of its longer axis overhanging portions of the shank, and a socket member having attaching means and a circular orifice, the wall of which is inexpansible and has a diameter greater than the length of the shorter axis and less than the length of the longer axis of the head, said wall being formed to compress the longer axis of the head and cause the overhanging portions thereof to snap into engagement with portions of said wall.

In testimony whereof I have affixed my signature.

ISIDOR MOSS.

Copies of this patent may be obtained for five cents each, by addressing the "Commissioner of Patents, Washington, D. C."